J. Wettstein
Cigar Mach.
No. 91,391.  Patented Jan. 15, 1869.
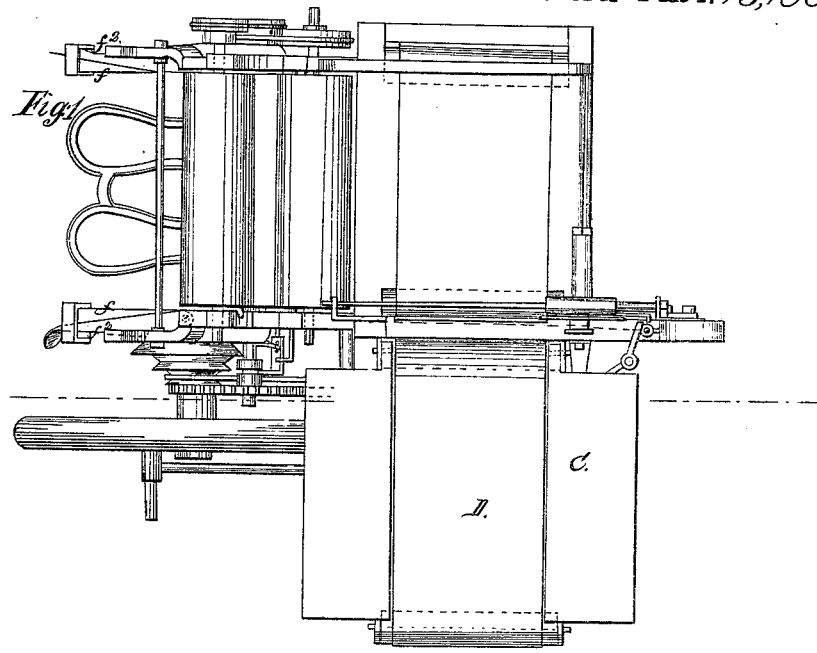
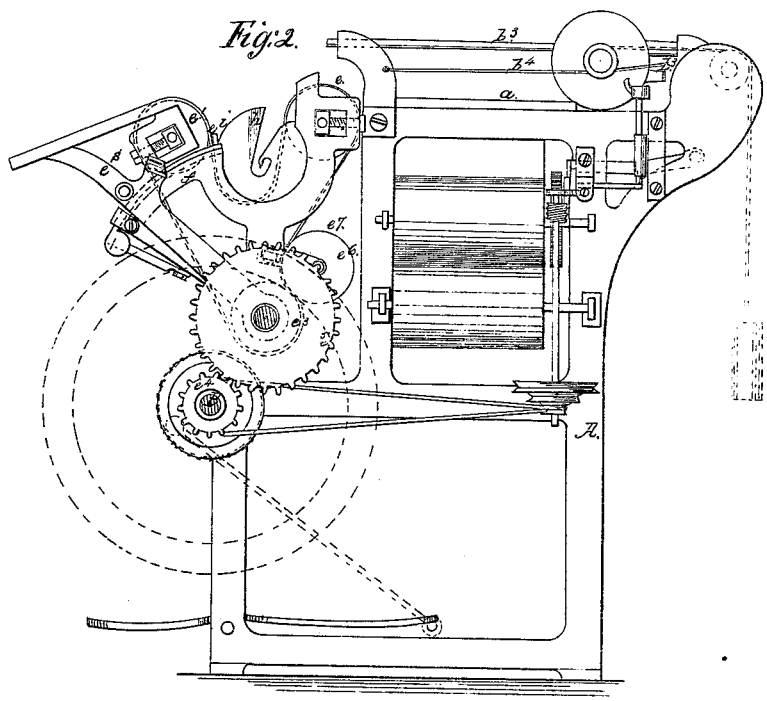
Witnesses.
Wm Dean Overell
C. C. Cotton.
Inventor:
J. Wettstein
per [signature]
Attorney.

J. Wettstein.
Cigar Mach.
Nº 91,391.    Patented Jan. 15, 1869.
Fig. 3.
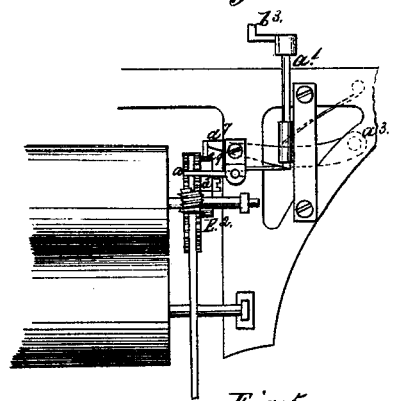
Fig. 4.
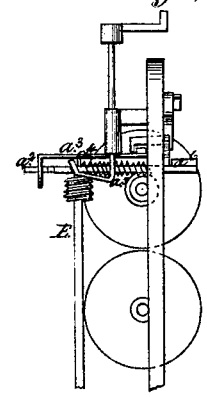
Fig. 5.
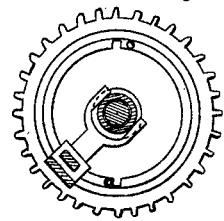
Fig. 6.
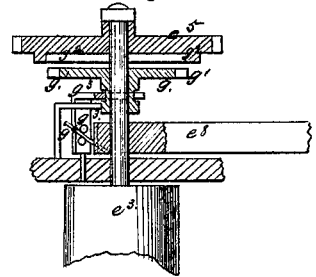
Fig. 7.
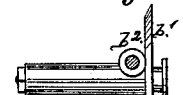
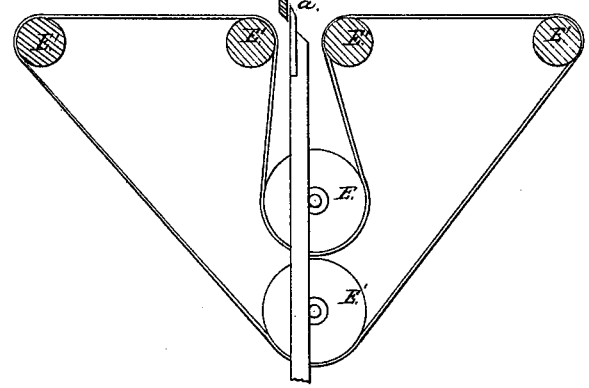
Witnesses,
Wm Dean Overell.
O. C. Cotton.
Inventor,
J. Wettstein
per Murray
Attorneys

United States Patent Office.

JOHN WETTSTEIN, OF LYNCHBURG, VIRGINIA.

Letters Patent No. 91,391, dated June 15, 1869.

MACHINE FOR ROLLING TOBACCO.

The Schedule referred to in these Letters Patent and making part of the same.

*To all whom it may concern:*

Be it known that I, JOHN WETTSTEIN, of Lynchburg, in the county of Campbell, and State of Virginia, have invented a new and useful Improvement in Machines for Rolling Tobacco; and I do hereby declare that the following is a full, clear, and exact description thereof, which will enable others skilled in the art to make and use the same, reference being had to the accompanying drawings, forming part of this specification, in which—

Figure 1 represents a plan view of my improved machine;

Figure 2 represents a side elevation;

Figures 3 and 4 represent views in detail of the means for stopping and starting the feed-roller;

Figures 5 and 6 represent views in detail of the means for stopping and starting the forming-rolls; and Figure 7 represents the cutters, and an end view of the feed-rolls and belt.

Similar letters of reference indicate like parts.

The nature of this invention relates to improvements in machinery for forming tobacco into rolls, the object of which is to provide a more economical means for accomplishing the same than those now in use.

It consists in a system of feed-rollers and belt, arranged to feed a sufficient quantity for the length of a roll; also, an arrangement of means for automatically stopping the feed when a sufficient quantity has been fed in; also, in a rotating cutter, arranged to be moved forward by the operator, to sever the amount so fed in, and to be thrown back, by a weight, into contact with mechanism for setting the feed-rolls into action again; also, in a system of rollers and a belt, arranged to receive the leaves so fed in, and form them into a roll; also, in a means of adjusting the said rollers to vary the sizes of the rolls; also, in an arrangement of means for opening and stopping the motion of the said rolls, to remove the finished roll, and for closing and for setting them into motion again; also, in an arrangement of means for wrapping the end of the roll; and also, in the several combinations hereinafter named.

On reference to the accompanying drawings—

A represents the frame of the machine.

B represents the driving-shaft, which may be operated by a treadle, or by any other suitable means.

C represents a feeding-table, provided with a feeding-belt, D, which is actuated by a roller, E, and works over a series of guiding-rollers, shown in fig. 7, and marked $E^1$.

The driving-roller is actuated by the worm-wheel on the upper end of the shaft F, which receives motion from the driving-shaft by means of pulleys and a belt.

The upper end of the shaft F is borne in a bent arm, $a$, projecting from the lower end of the vertical shaft $a^1$, which is supported in a bracket secured to the frame of the machine.

$a^2$ represents a sliding rod, supported in a bracket, $a^3$, also secured to the frame, and provided with a pin, $a^4$, spiral spring, $a^5$, and a notch, $a^6$.

The pin bears against the bent arm $a$, and the tendency of the spring is in the direction to throw the worm out of gear with the worm-wheel on the shaft of the feed-roller E.

$a^7$ represents a spring-latch, pivoted to the frame at $a^8$, and provided with a pendent projection, $a^9$, on the inner end.

The said latch rests in the notch $a^6$ of the sliding rod $a^2$, and holds the worm in gear with the worm-wheel $E^2$ until a lug, $a^{10}$, on the said wheel, striking the projection $a^9$ of the latch $a^7$, raises it out of the notch $a^6$ in the sliding rod $a^2$, when the spring $a^5$ will throw the worm out of gear with the wheel E $b$ represents an arm, secured to the top of the shaft $a^1$, the object of which will be presently described.

$d$ represents a fixed cutter, arranged upon the frame of the machine, across the feeding-path, about in line with the upper face of the feeding-belt.

$b^1$ represents a rotary and reciprocating cutter, arranged on a slide, $b^2$, which works back and forth on the slide-rod $b^3$, arranged in the proper position to permit the rotary cutter to act in conjunction with the stationary cutter $d$, to cut off the sheets or leaves of tobacco when a sufficient quantity has been fed in for the length of a roll.

The roller E is designed to be of the right size for one revolution to feed in a sufficient quantity, as above described.

When the said roller has made one revolution, the lug $a^{10}$, on the wheel $E^2$, will lift the latch $a^7$ out of the notch in the slide $a^2$, when the spring $a^5$ will throw it outward against the arm $a$, disconnecting the worm from the wheel $E^2$, stopping the feed-rollers, at which time an amount of tobacco equal in length to the circumference of the feed-roll will have been fed in beyond the cutters.

The operator, then laying hold of the handle of the slide $b^2$, will move the sliding cutter across the said feeding-path, cutting off the strip of tobacco.

The sliding cutter will also be set into rotary motion by a cord, $b^4$, which is wound over the shaft of the cutter, and fastened at each end to the frame.

A weight is connected to the slide $b^2$, for drawing it back, and works over a pulley for that purpose, shown in red in fig. 2.

A projecting rod, $b^5$, on the cutter-slide $b^2$, will, when the slide is drawn back by the weight, strike the end of the arm $b$ on the shaft $a^1$, and swing it around, so as to throw the worm into gear with the worm-wheel $E^2$, and thereby set the feed-rollers into motion again for feeding in another similar quantity.

$e$ and $e^1$ represent forming-rollers, and $e^2$ a forming-belt, which are actuated by a roller, $e^3$, shown in dotted lines in fig. 2, and clearly in fig. 6, which receives its motion from the driving-shaft B, through the pinion $e^4$ and the wheel $e^5$.

$e^6$ represents a roller, arranged in adjustable brackets $e^7$, whereby the belt may be so governed as to control the size of the roll to be formed.

The roller $e^1$ is arranged in swinging arms $e^8$, which oscillate on the axle of the roller $e^3$, whereby it may be moved up near to the roller $e$, or away from it, as in figs. 1 and 2.

The side-frames are provided with curved brackets $f$, whereon are arranged spring-catches $f^2$, which catch behind the arms $e'$, and hold them in position, when they are adjusted to the working-position 1.

The forming-belt is made of sufficient length, and arranged to lie in the space between the rollers $e$ and $e^1$, wherein the roll is to be formed.

The operator, when the forming-roller has been moved up into working-position, as shown in fig. 1, and motion communicated to them, seizes hold of the sheet of tobacco, which has been fed in and cut off, as before described, and draws it on to the forming-belt, over the roller $e$, whereby it is fed down into the lug of the belt, between the said rollers $e$ and $e'$, when it is formed up into the roll, as will be readily understood, after which the roller $e'$ is moved back again to the position shown in fig. 2, and the roll removed by the operator preparatory to forming another.

As it is desirable that the forming-belt and rollers should not be in motion while the roll is being removed, the hereinafter-described mechanism has been devised, whereby the same may be automatically started into motion or stopped by action of the swinging arms $e^8$, in moving up to or away from the roller $e$.

The wheel $e^5$, (see fig. 6,) is arranged to run loosely on the shaft of the roller $e^3$.

$g$ represents a clutch, arranged to slide loosely on the said shaft, but connected thereto by a spline working in a groove in the said shaft, whereby it may communicate rotary motion to it.

The clutch-plate is provided with projections $g^1$, and the wheel $e^5$ is provided, on the side adjacent to the clutch, with a recess, wherein pins $g^2$ are fixed, so as to catch the projections $g^1$, on the clutch-plate, when the latter is moved up into the recess, and communicate motion to the clutch $g$, and to the shaft of the roller $e^3$.

$g^3$ represents a crotched right-angled slide, which takes into a groove in the hub of the clutch $g$, which is moved to or from the wheel $e^5$ by the angularly-arranged wing-plate $e^4$, projecting from the end of the swinging arm $e^8$, which works between the pins $g^5$, in the face of the slide $g^3$.

When the operator moves the swinging arms toward the fixed roller $e$, the wing-plate $g^4$ moves the clutch toward the wheel $e^5$, and engages it therewith, thereby setting the forming-rollers and belt into motion, and when he moves them in the opposite direction, to take out the finished roll, the wing-plate moves the clutch-plate in the opposite direction, disconnecting the same from the wheel $e^5$, and stopping the motion of the rollers and belt.

$h$ represents a circular cap, arranged in the proper position, and provided with a slit and curved lip for forming the wrappers around the end of the roll.

The stock for forming the roll is placed by the operator on the feeding-belt D, and properly spread out thereon, and the wrappers are also fed in by him at the proper time to the forming-belt $e^2$.

The sides of the feeding-trough in which the belt D works may be made adjustable, whereby the quantity to be fed in may be regulated, as desired.

Having thus described my invention,

I claim as new, and desire to secure by Letters Patent—

1. The feed-rollers E and $E^1$, and feeding-belt, in combination with the feeding-table C, when constructed and operated substantially as and for the purpose described.

2. The combination, with the feed-rollers and belt, of the means arranged, substantially as described, for stopping the feed, as and for the purpose set forth.

3. The combination, with the feed-rollers and belt, of the cutters, substantially as and for the purpose described.

4. The combination, with the feed-rolls and belt, of the means for automatically setting them into gear with the driving-mechanism, substantially as and for the purpose described.

5. The combination, with the said means for setting the feed-rolls into gear with the driving-mechanism, of the sliding cutter-frame, substantially as and for the purpose described.

6. The forming-rolls $e$ and $e^2$, and forming-belt $e^2$, arranged for joint operation, substantially as and for the purpose described.

7. The combination of the same with the driving-roll $e^3$, substantially as and for the purpose described.

8. The combination, with the same, of the adjustable roller $e^6$, substantially as and for the purpose described.

9. The forming-roller $e^1$, arranged in oscillating bearings, substantially as and for the purpose described.

10. The combination, with the forming-rolls and belt, of the means, substantially as described, for connecting and disconnecting the said rolls and belt with the driving-mechanism, as and for the purpose specified.

11. The combination, with the forming-rolls and belt, of the wrapping-plate $h$, substantially as and for the purpose described.

12. The combination, with the forming-mechanism, of the feeding-mechanism, substantially as and for the purpose described.

JOHN WETTSTEIN.

Witnesses:
 FELIX DELBELVUE,
 JOHN STELBIG.